United States Patent [19]
Greenstein et al.

[11] Patent Number: 5,765,210
[45] Date of Patent: Jun. 9, 1998

[54] ALLOCATION OF REAL STORAGE FOR HARDWARE DESCRIPTORS WITHIN VIRTUAL MEMORY THAT ARE ASSOCIATED WITH ON-LINE STORAGE INCREMENTS

[75] Inventors: Paul Gregory Greenstein. Croton-on-Hudson; John Ted Rodell. Wappingers Falls; Danny Ray Sutherland. Poughkeepsie. all of N.Y.

[73] Assignee: International Business Machines Corporation. Armonk. N.Y.

[21] Appl. No.: 354,573

[22] Filed: Dec. 12, 1994

[51] Int. Cl.$^6$ ............................................. G06F 12/08
[52] U.S. Cl. ..................................... 711/208; 711/209
[58] Field of Search ............................. 395/417, 416, 395/418; 711/206, 207, 208, 209

[56] References Cited

U.S. PATENT DOCUMENTS

| | | | |
|---|---|---|---|
| 4,376,297 | 3/1983 | Anderson et al. | 711/207 |
| 4,385,352 | 5/1983 | Bienvenu | 711/208 |
| 5,101,485 | 3/1992 | Perazzoli, Jr. | 711/206 |
| 5,159,678 | 10/1992 | Wengelski et al. | 711/153 |
| 5,586,283 | 12/1996 | Lopez-Aguado et al. | 711/207 |

OTHER PUBLICATIONS

"Means for Dynamic Allocation of Sparse Tables." IBM Technical Disclosure Bulletin, vol. 32, pp. 214–16, Sep. 1989.

IBM –Enterprise Systems Architecture/390 –Principles of Operation, SA22–7201–01. Second Edition (Mar. 1993), pp. iii–X33. (entire publication).

IBM –MVS/ESA –System Commands, MVS/ESA System Product: JES2 Version 4, JES2 Version 4. GC28–1626–04, Fifth Edition, (Mar. 1993), pp. iii–xii, 4–35–4–44.

*Primary Examiner*—Eddie P. Chan
*Assistant Examiner*—Kevin Verbrugge
*Attorney, Agent, or Firm*—Lawrence D. Culter, Esq.; Heslin & Rothenberg, P.C.

[57] ABSTRACT

The amount of real memory space used by descriptor tables of a computer system is reduced. On system initialization, sufficient contiguous virtual memory space for each table is allotted for descriptors in the tables to define all memory space in both central storage and expanded storage. However, only descriptors for on-line storage locations, relative to a particular partition, are placed in these tables. As the system operates, the tables are continuously updated, removing descriptors for storage locations taken off-line and adding descriptors for blocks of memory brought on-line so that the tables reflect only the storage locations then on-line in the particular partition.

46 Claims, 8 Drawing Sheets

ALLOCATION OF REAL STORAGE FOR HARDWARE DESCRIPTORS WITHIN VIRTUAL MEMORY THAT ARE ASSOCIATED WITH ON-LINE STORAGE INCREMENTS

FIELD OF THE INVENTION

This invention relates to the field of systems control programming. More specifically, it relates to the management of data tables describing memory resources being used in a data processing system.

DESCRIPTION OF THE PRIOR ART

In a virtual storage data processing operating system, such as International Business Machines Corporation's (IBM's) Multiple Virtual Storage/Enterprise Systems Architecture (MVS/ESA) operating system, separate storage descriptor tables are used to manage allocation and use of central storage and expanded storage. The storage descriptor tables usually reside in central storage each in an area of contiguous virtual storage. Presently, tables representing all storage potentially available to the operating system are assigned real memory addresses when the system is initialized, whether that storage is currently available (called "on-line") to the operating system or not (called "off-line").

The IBM MVS/ESA operating system uses a table entry or descriptor of 32 bytes to manage each 4K bytes of either central or expanded storage.

A processor may operate in one of two modes—basic or logically partitioned (LPAR) mode. A partition is an independent collection of hardware resources capable of supporting an operating system. Each partition may run a different operating system. In basic mode, a processor may contain one or two physical partitions where each control program executes directly on the machine. In LPAR mode, each physical partition may contain many logical partitions. Each partition, whether physical or logical, requires a separate set of storage descriptor tables.

It is recognized that when an operating system runs on a machine where the storage is dynamically configurable a considerable amount of central storage is used in managing storage that is not in use by the operating system. Machines running under IBM's Processor Resource/System Manager (PR/SM) facility in LPAR mode can be defined with a small initial storage configuration for each logical partition, but must have potential to acquire storage dynamically when other partitions are deactivated or release their storage. Therefore, most of the real memory addresses assigned for use in the tables are used just to allow for the later dynamic addition of storage later.

For instance, on a physically partitionable machine, such as an IBM ES/9000 processor, with 1 Gigabyte of central storage and 8 Gigabytes of expanded storage, running an IBM MVS/ESA operating system each partition would require 72 Megabytes in central store to describe all possible central storage locations, and all possible expanded storage locations, for a total of 144 Megabytes for the two partitions. In a typical situation, each partition would actually need only a maximum 36 Megabytes of central storage to describe all potential central storage and expanded storage locations for the partition.

SUMMARY OF THE INVENTION

In accordance with the present invention, the amount of real memory space used by the tables is reduced. On machine initialization, sufficient contiguous virtual memory space for each table is allotted for descriptors in the tables to define all memory space in both central storage and expanded storage. However, only descriptors for on-line storage locations, relative to a particular partition, are placed in these tables. As the system operates, the tables are continuously updated, removing descriptors for storage locations taken off-line and adding descriptors for blocks of memory brought on-line so that the table reflects only the storage locations then on-line in the particular partition.

Therefore, it is the object of the invention to reduce the amount of real central storage space used for storage descriptor tables.

It is a further object of this invention to provide a new method and apparatus to generate and run the storage descriptor tables.

It is a further object of this invention to permit the dynamic addition of descriptors for either existing off-line or newly installed storage.

These and other objects, features and advantages of the present invention can best be understood from the following description of one embodiment of the invention when read in connection with the accompanying drawings.

DESCRIPTION OF THE PREFERRED EMBODIMENT

Figure 1:
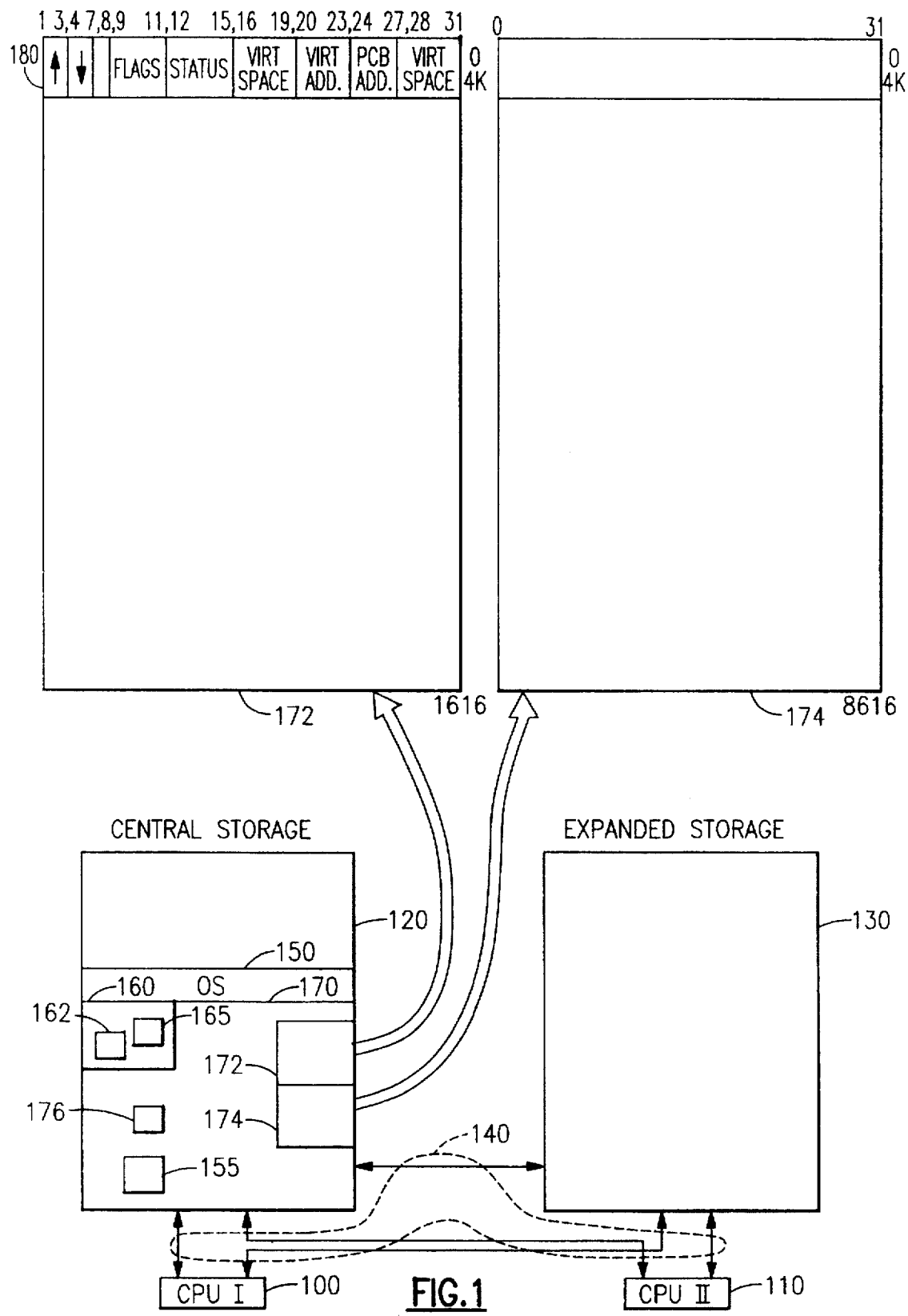
FIG. 1 is a block diagram showing a computer system with two central processors, a central storage and an expanded storage that incorporates the present invention.

The preferred embodiment, using IBM's S/390 computing system and IBM's MVS/ESA operating system, is depicted in the accompanying figures and the following description. As shown in FIG. 1 the computing system includes two central processing units (CPUs), 100 and 110, with a one gigabyte central processor storage, 120, and an eight gigabyte expanded storage 130. Storage in both central store 120 and expanded storage 130 is accessible in 4K-byte blocks. The processors, 100, 110, and the stores 120 and 130, are connected by a bus system, 140, which enables the transfer of information in the form of data and instructions between the CPUs 100 and 110 and the stores 120 and 130.

Each CPU has at least one operating system 150 running in it. That operating system includes a processor storage management component, 160, with storage configuration management component, 170, having storage descriptor tables, 172 and 174, an address increment map, 176 with one identifier for each increment. An increment is smallest amount of storage that can be taken off-line or placed on-line. The storage management component also includes tables, 162, for translation of virtual address to central memory addresses. Virtual addressing is described in "Enterprise Systems Architecture/390 Principles of Operation" SA22-7201-01, published by the International Business Machines Corporation in 1990, starting on page 3-4. This publication is herein incorporated by reference. The storage management component also includes an initialization means, 165, for initializing tables for all processor storage, central and expanded, and a reconfiguration means, 155, for changing the amount of storage necessary to describe processor storage.

Sufficient virtual space is reserved, 120, for tables to accommodate descriptors, 180, for all storage locations in both central and expanded storage. The reserved virtual space is contiguous for each table. The descriptors, 180, each cover a block of 4K bytes and are 32 bytes long. The descriptors in a table each cover 4K bytes of real addresses. The actual address of a block covered by any descriptor for central storage can be obtained in accordance with the following formula:

$$RA = \frac{(VATE - FVATE) \times \text{block size}(4K)}{\text{Descriptor Length}(32 \text{ bytes})}$$

where
RA=Real address of table entry
VATE=Virtual address of table entry
FVATE=First virtual address table entry.

In expanded storage, data is addressed by block number (BN);

$$BN = \frac{VATE - FVATE}{\text{Descriptor Length}(32 \text{ bytes})}$$

The bytes of the descriptor in central storage are allocated as follows:
a. bytes 0 to 3=the address in the table of the next descriptor in the present queue.
b. bytes 4 to 7=the address in the table of the previous descriptor in the present queue.
c. byte 8=identity of the present queue.
d. bytes 9 to 11=flags indicating status of data in 4K byte covered by the descriptor.
e. bytes 12 to 15=contains status information about virtual paging.
f. bytes 16 to 19=virtual space information.
g. bytes 20 to 23=virtual address currently applicable to this 4K byte block.
h. bytes 24 to 27=address of page control block (PCB) relating to this frame.
i. byte 28 to 31=addition virtual space information.

Figure 2:
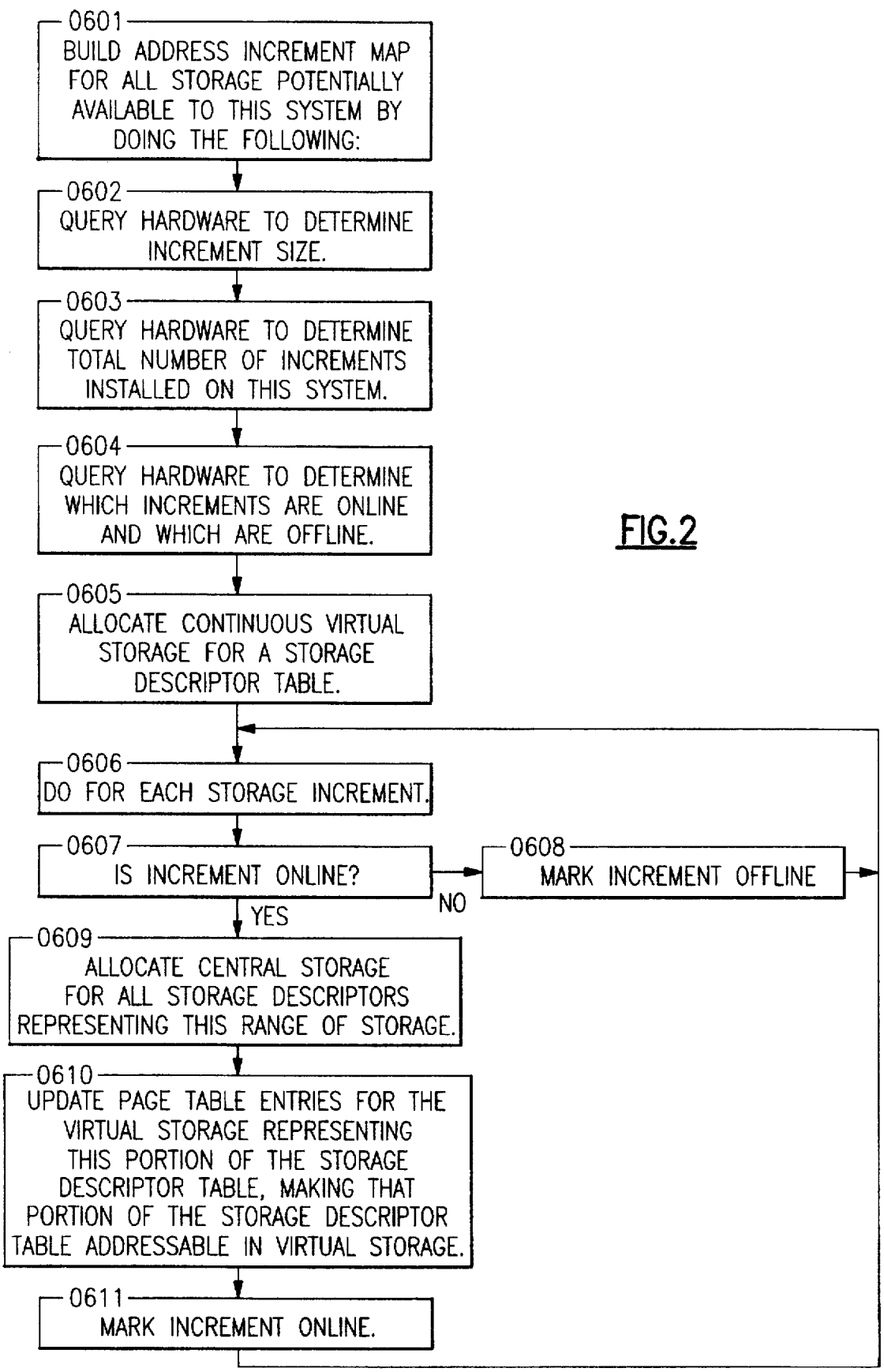
FIG. 2 is a flow diagram that shows the process for establishing the storage descriptor on initialization of the processor.

Referring now to both FIGS. 1 and 2, during system initialization, the address increment map (AIM), 176, is built 0601 to represent all potential storage available to the system (9 gigabytes). The hardware is queried, 0602, to determine the size (4K-byte) of processor storage increments on the machine, and the total number of installed storage increments, 0603. For both central and extended storage in each partition, the hardware is queried, 0604, to determine which processor storage increments are available (on-line). The operating system for each descriptor table reserves contiguous virtual storage, 0605, for all possible storage descriptors in that table.

With respect to each descriptor table, each storage increment is processed, 0606. The corresponding address increment map will be set to indicate which increments of storage are on-line, 0611, or off-line, 0608. For each on-line increment, its status is indicated in the AIM 176 and real central storage space is allocated 0607 for the descriptor for that portion of storage in the central storage descriptor table, 0609. The valid bits in the virtual storage representing each such portion of the storage descriptor table are updated with the central storage addresses of the central storage frames allocated above, making those portions of the storage descriptor table addressable in virtual storage, 0610. For each off-line increment, its status is indicated, 0608, in the AIM 176. However, no entry is made in the central storage descriptor table for off-line storage blocks or increments. As pointed out above, steps 605 and 611 are repeated for descriptor tables for each partition.

During system operation, memory allocation changes. Different increments are brought on-line while others are taken off-line. The storage configuration management and processor storage management components are responsible for adding and removing storage managed by the operating system. These components are used to allocate real addresses in central storage for the storage descriptor pages representing storage being added to the configuration and free up real addresses in central storage allocated to the storage descriptor pages representing storage being removed from the configuration. The operating system will provide the capability for storage configuration management components to be aware of which portions of the storage descriptor table are in central storage ("on-line storage"), and those which are not ("off-line storage"). The operating system will continue to keep track of the status of all of storage through the AIM. However, storage configuration management and processor storage management components may now examine the status of any increment of storage and determine if the storage descriptors for that storage exist. Since storage descriptors for off-line storage will not be in central storage, storage configuration management components use the load real address (LRA) instruction, described starting on page 10-25 of the aforementioned "Enterprise System Architecture Principles of Operation" manual, to determine if a particular section of the storage descriptor table is in central storage.

Figure 3A:
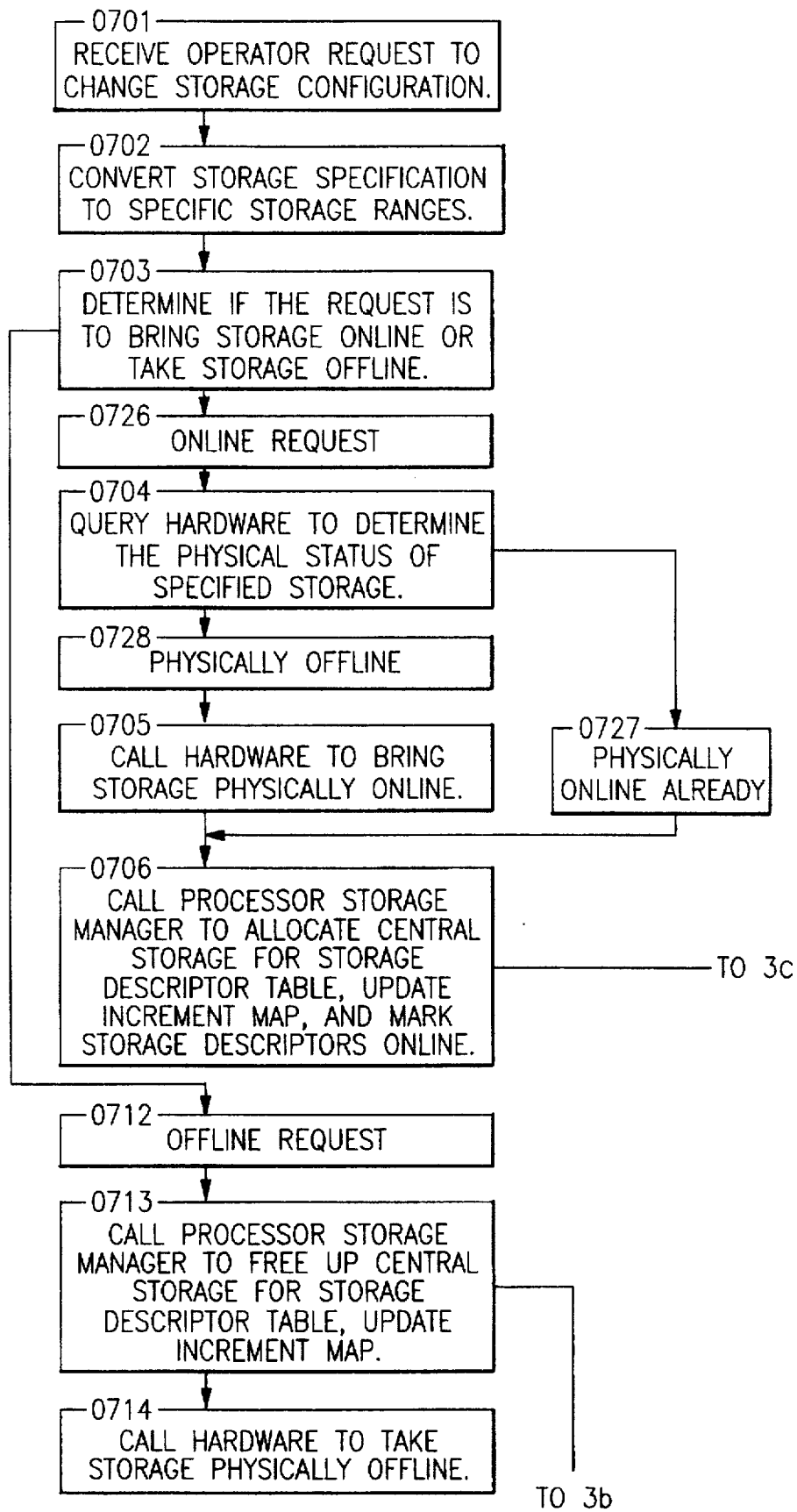
FIGS. 3a–3c contain a flow diagram for the reconfiguration of the storage descriptor tables when an operator changes the memory configuration.
Figure 3B:
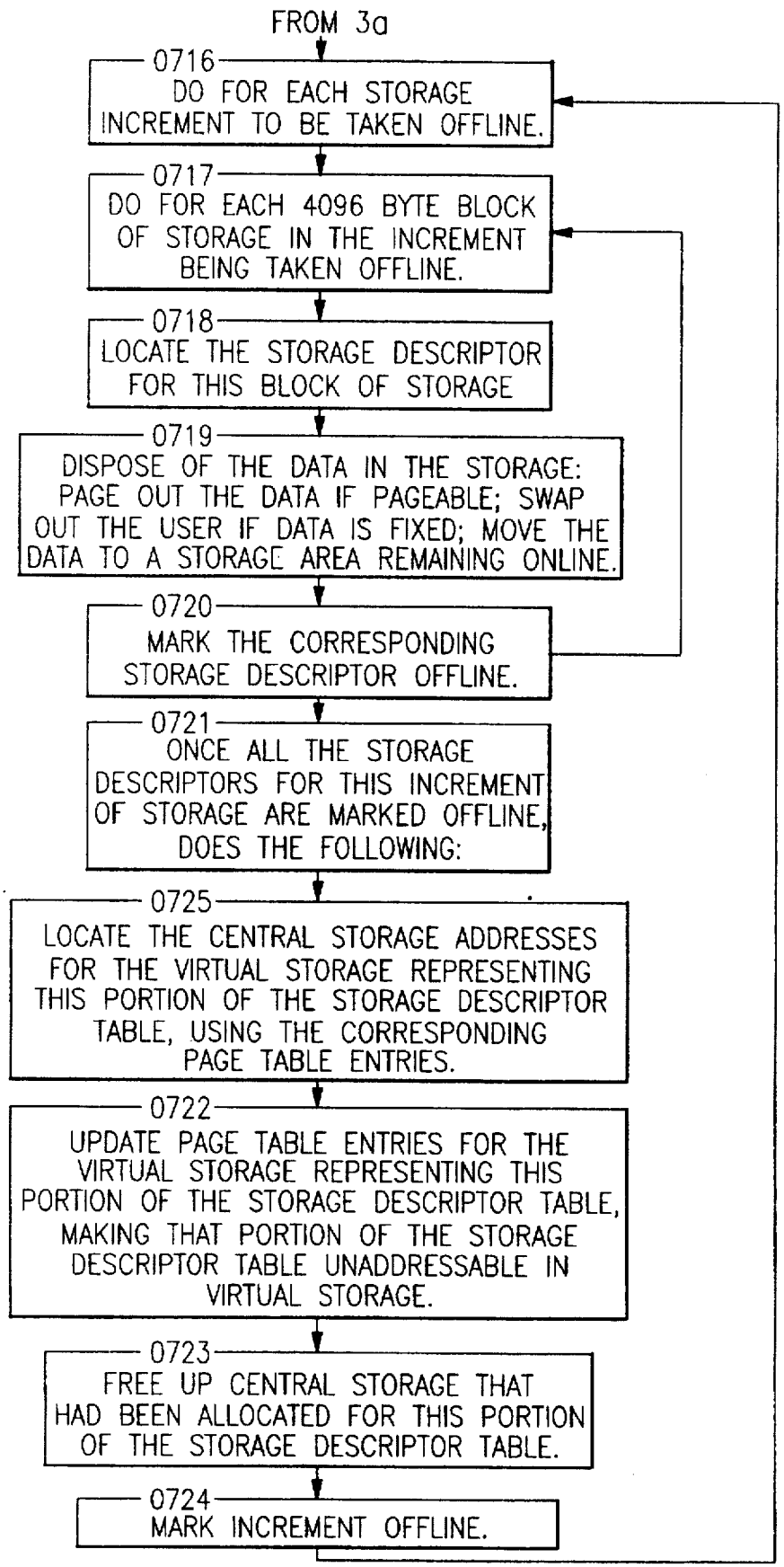
Figure 3C:
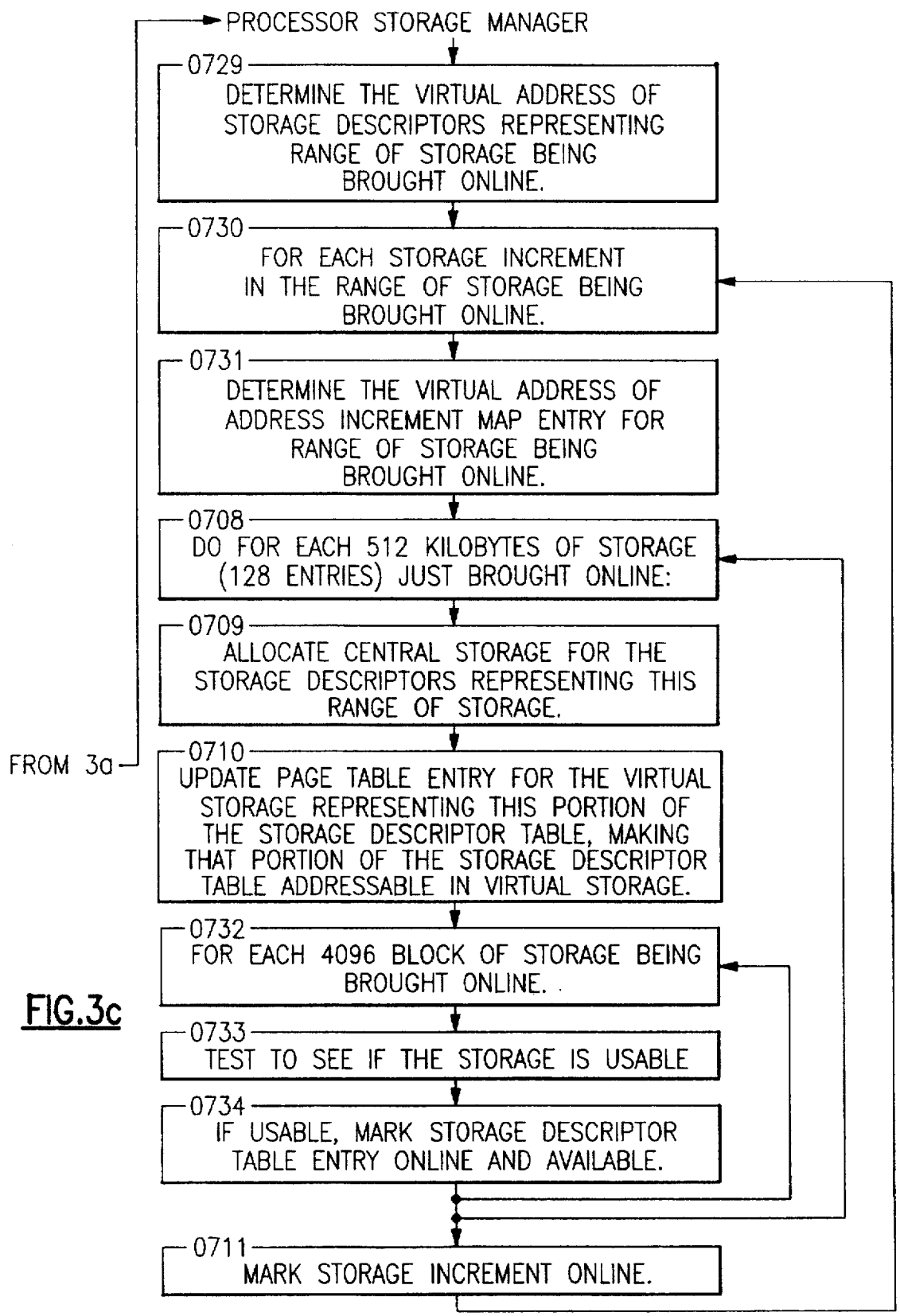

Referring to FIGS. 3a–3c, a request, 0701, may be received from the systems operator to change the storage configuration. The request is in the form of a CONFIG STOR command, a description of which is found in Section 4.6 of the "MVS/ESA System Commands MVS/ESA System Product: JES2 Version 4, JES3 Version 4", published by the IBM Corporation 1988, 1993, which manual is incorporated by reference. This command provides specific addresses, storage increments, or storage elements (collections of storage increments). The storage configuration management component calculates the specific storage addresses, 0702, when the request is specified with storage increments or storage elements. The storage configuration management component then determines the type of request, 0703.

The request may be to add existing off-line storage or to add newly installed storage, 0726. The storage configuration management component queries the hardware to determine whether the storage is physically on-line, 0704. If the storage is not on-line, 0728, the storage configuration management component calls the hardware, 0705, to configure (or bring) the storage on-line. If the storage is physically on-line, 0727, this hardware call is not necessary. The storage configuration management component calls the processor storage management component, 0706, with the storage range to bring on-line. The processor storage management component determines the virtual address of the storage descriptor table entries for the range of storage to be brought on-line, 0729. For each storage increment in the range of storage being brought on-line, 0730, the processor storage management component determines the virtual address of the address increment map entry for storage to be brought on-line, 0731. For each group, 0708, of a selected number of storage descriptor table entries within each such storage increment representing storage to be brought on-line, a central storage frame is allocated, 0709, to hold that group of entries. Additionally, the page table entry, which represents that group of the storage descriptor table entries added to the central storage, is updated, 0710, with the central storage address of the allocated central storage frame, so that the group of storage descriptor table entries is addressable in virtual storage.

For each new 4K byte block of central storage to be configure on-line, 0732, the storage is tested, 0733, to see if it is usable using the Test Block (TB) instruction described on page 10-73–10-75 of the above cited Principles of Operation manual. If it is usable, the storage is marked on-line and made available to use, 0734. The associated address increment map entries are marked on-line 0711.

The request may be to delete storage (or take it off-line), 0712. The storage configuration management component calls the processor storage management component, 0713, to remove the storage from use by the operating system. For each storage increment, 0716, in the range of storage being taken off-line, the following processing is done. For each block of storage, 0717, in the increment, the respective storage descriptor table entry representing the requested storage to be deleted is located, 0718. The disposition of the data residing in the storage is determined. The disposition includes discarding the data, migrating the data to an input/ output (I/O) device, or moving the data to other storage areas. The requested storage is freed up, 0719, by paging out data, swapping out users, etc. The storage descriptor table entry is marked off-line, 0720. The central storage address of each portion of the storage descriptor table in which storage descriptor table entries are marked off-line is located, 0725, using the page table entry. This page table entries of that part of the storage descriptor table are marked as invalid, so that that part of the storage descriptor table is no longer addressable in virtual storage, 0722. The central storage frame which was used for that part of the storage descriptor table is now made available for use, 0723. The associated address increment map entry is marked off-line, 0724. When the processor storage management component returns to the storage configuration management component, the storage configuration management component then calls the hardware, 0714, to take the requested storage physically off-line.

Figures 4, 5:
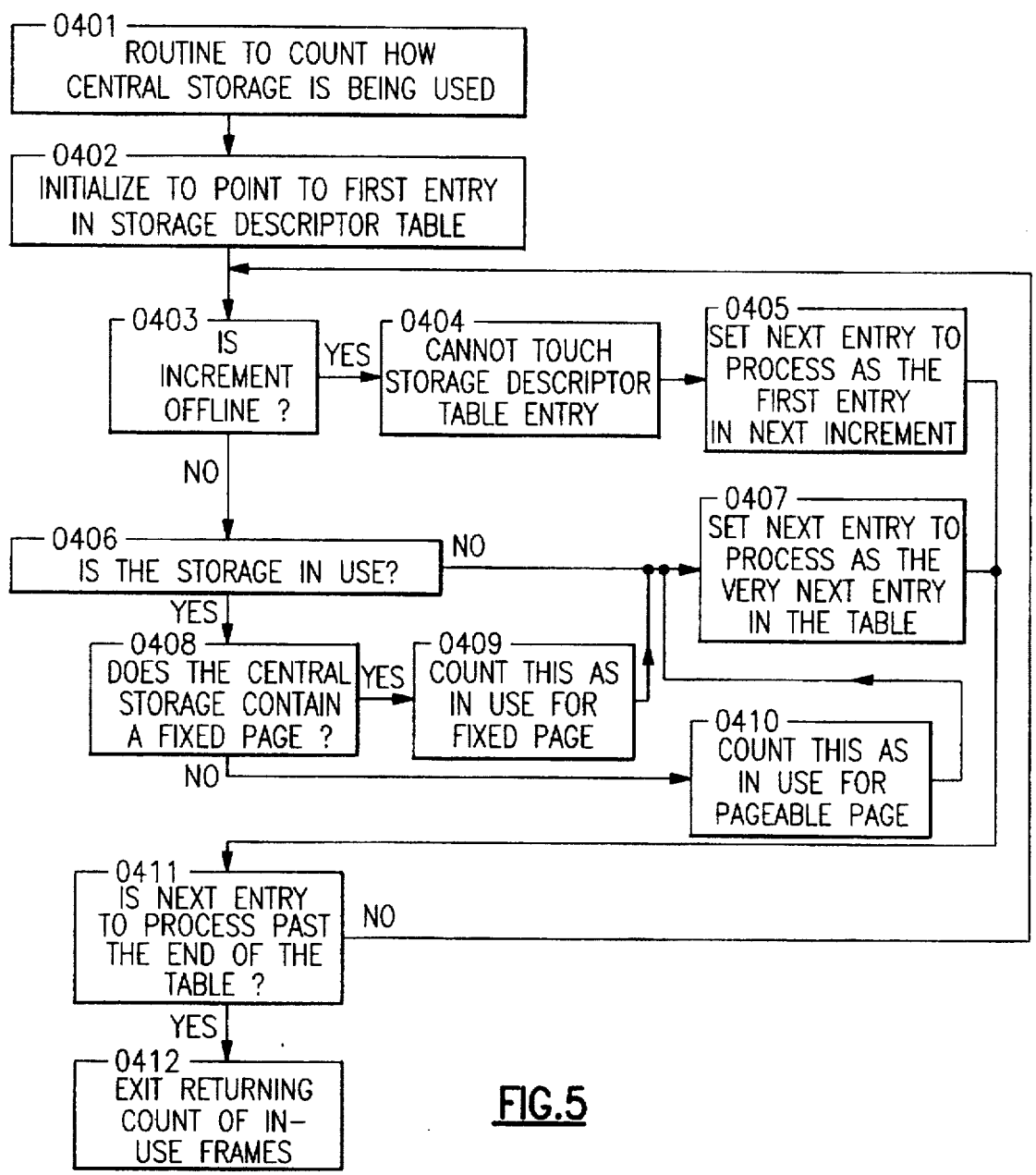
FIG. 4 shows the relationship between a storage descriptor table and an address increment map.
FIG. 5 is a flow diagram showing the logic for scanning a specific entry in the storage descriptor table.

At system initialization time, the operating system will only allocate central storage for storage descriptor blocks which represent on-line increments of storage. The corresponding maps will be set to indicate which increments of storage are on-line or off-line. FIG. 4 shows a storage increment map, 0301, with five increments and the associated storage descriptor table, 0302. The individual entries in the storage descriptor table are shown as storage descriptor table entries (SDTE). The first two increments of storage, 0303 and 0304, are on-line and the corresponding sections on the storage descriptor table, 0308 and 0309, are in central storage. The next two increments, 0305 and 0306, are off-line and the corresponding sections of the storage descriptor table, 0310 and 0311, are not in central storage, although the virtual storage is set aside for that portion of the storage descriptor table. The last increment of storage, 0307, is on-line and the corresponding section of the storage descriptor table, 0312, is in central storage.

For a function of a processor storage management component which processes queues of available or in-use storage resources, no special processing needs to be done to support this invention. This is because the queues of available storage blocks are in-use storage blocks will not contain any descriptors for off-line storage blocks.

Certain functions of a processor storage management component process the storage descriptor tables directly, indexing from one entry to the next. One such function in the IBM MVS/ESA operating system is the expanded storage migration function, which processes the expanded storage table looking for the least recently referenced expanded storage frames to select appropriate candidates for page migration. Currently, this process looks at each entry in the table, processing each off-line entry serially until an entry representing on-line storage is found. Storage management components which process the storage descriptor tables, avoids taking interrupts trying to look at non-existent portions of the tables. For example, attempting to look at a storage descriptor entry not currently addressable in central storage would result in a page translation exception which is not resolvable. A benefit of this invention provides the ability to skip those portions of the table representing off-line storage, without processing each entry serially. This should result in overall better performance for those functions, when some storage is off-line. When no storage is off-line, the overhead to check for the existence of each portion of the table should be minimal (ie., under 10 instructions per increment processed).

FIG. 5 illustrates processing which indexes from one entry to the next in the storage descriptor tables. In this example, the term "frame" means a 4096 byte (4K) block of central storage on a 4K addressing boundary. This figure shows a routine, 0401, which scans the storage descriptor table for central storage and counts whether the frame is in use for a pageable page or for a non-pageable (fixed) page. The routine sets the initial storage descriptor to examine as the first entry in the storage descriptor table, 0402. The routine then examines the storage increment map to determine if the increment containing the central storage represented by this descriptor is on-line, 0403, using an address increment table, 0301, described in FIG. 7. If the increment is on-line, the storage descriptor is examined to determine if the storage is in use, 0406. If the storage is in use, then if the page in the frame is fixed, 0408, the storage is counted as being in use for a fixed page, 0409; otherwise, the storage is counted as being in use for a pageable page, 0401. Whether the storage is in use or not, the next entry of the storage descriptor table to process is set to the next entry in the table, 0407. This storage descriptor is examined to determine if it is beyond the end of the storage descriptor table, 0411. If it is not, then the scan continue, 0403. If the storage descriptor is beyond the end of the storage descriptor table, then the scan of the storage descriptor table is complete, and the routine exits, 0412, returning the counts of frames in use for pageable and nonpageable pages. If the increment is not on-line, 0404, then the storage descriptor cannot be referenced since it is not in central storage, so the next entry in the storage descriptor table to be processed is set to the storage descriptor representing the first central storage frame in the next increment, 0405. This storage descriptor is examined to determine if it is beyond the end of the storage descriptor table, 0411. If it is not, then the scan continues, 0403. If the storage descriptor is beyond the end of the storage descriptor table, then the scan of the storage descriptor table is complete, and the routine exits, 0412, returning the counts of frames in use for pageable and nonpageable pages.

Furthermore, there also exist certain functions of a processor storage management component which look at a specific entry in one of the storage descriptor tables. One example of such a function is the page fault processing in the IBM MVS/ESA operating system. This processing needs to determine if a central storage frame has already been allocated for the page. To do this, the page fault function uses the central storage address portion of the page table entry to determine which central storage frame most recently was used for the page. The storage descriptor address for that central storage frame can be computed, since the operating system maintains the storage descriptors in contiguous virtual storage. However, that central storage frame could now be off-line and its storage descriptor block no longer in central storage. Such functions will require extra processing to avoid taking interrupts attempting to look at nonexistent portions of the storage descriptor tables. The overhead for such processing is minimized by setting the central address portion of the page table entry to a known invalid state when removing a page from central storage. When a page table entry is encountered with one of these known invalid values, there would be no need to check any further, since the program would then know that no copy of the page exists in central storage. This will reduce the number of times that page fault processing tests for the existence of the storage descriptor tables to those cases where another processor had already brought the page into central storage or was in the process of bringing the page in from paging space.

Figure 6:
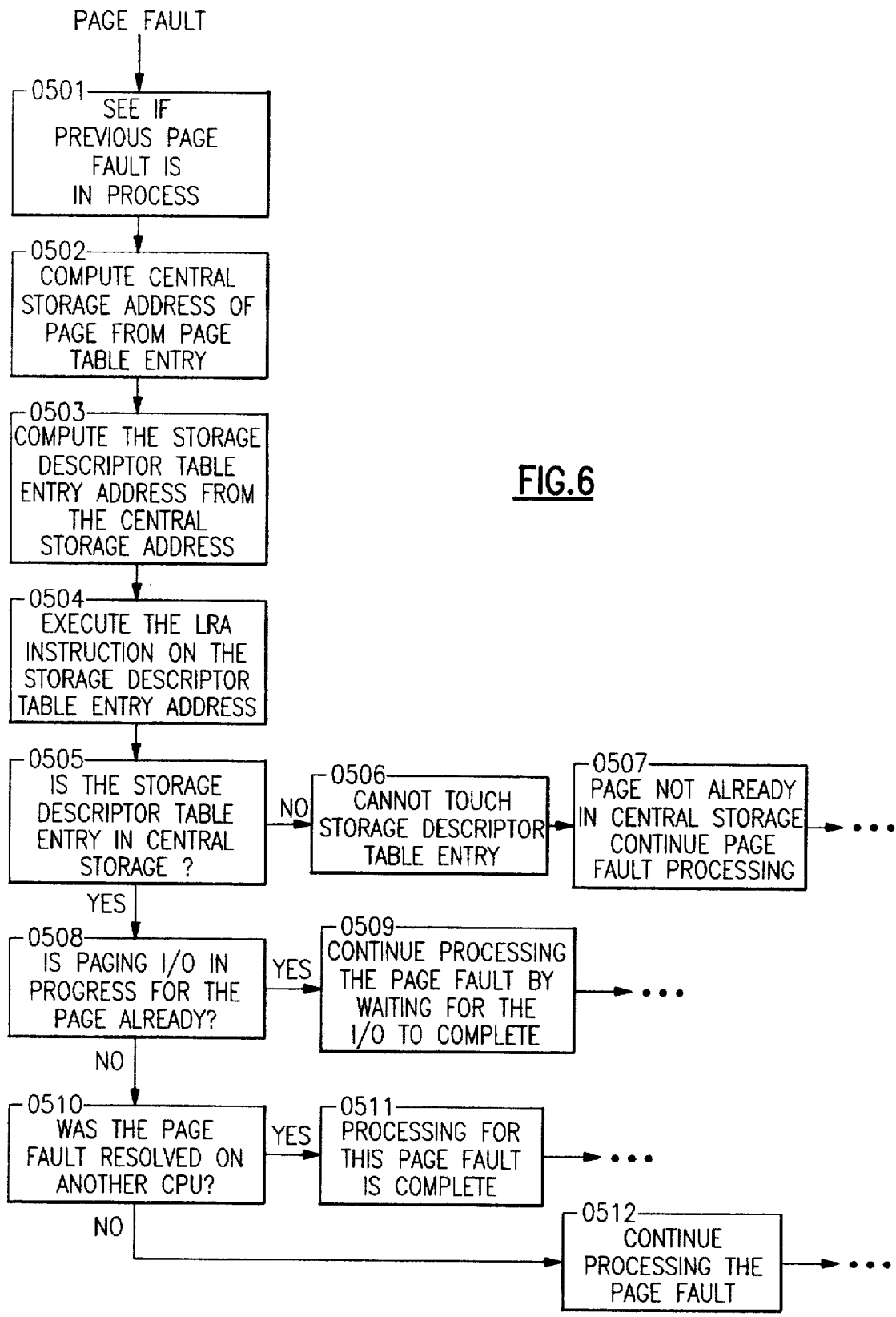
FIG. 6 is a flow diagram showing the logic for processing an entry in a storage descriptor table through a table look-up.

FIG. 6 is an example of processing which looks at a specific entry in a storage descriptor table. Only those portions of the routine which illustrate this invention are described here. This figure shows a routine which processes page translation exceptions (page faults). The first step the routine performs is to determine if from a previous page fault, the page is already in central storage, or on its way in 0501. To do this, the most recent central storage address of the page is determined by extracting the central storage address portion of the page table entry (called "PTE") for the page, 0502. The address of the corresponding entry in the storage descriptor table for central storage is computed next, 0503. Since the central storage frame (and its entire increment) that last contained this page may now be off-line, the portion of the storage descriptor table that describes that central storage frame may not be in central storage. The routine issues Load Real (LRA) instruction, 0504, to determine if this storage descriptor is in central storage, 0505. If the storage descriptor is not in central storage, then the routine cannot examine the storage descriptor table entry, 0506. However, the routine is assured that the page cannot already be in central storage, and continues to process the page fault by bringing in a new copy of the page, 0507. If the storage descriptor is in central storage, then the storage descriptor is examined to determine if paging I/O is already in progress for the page, 0508. If paging I/O is already in progress for the page, the routine continues processing this page fault by waiting for the paging I/O to complete, 0509. If there is no paging I/O in progress for the page, the routine then examines the storage descriptor table entry to determine if the page is already in central storage, 0510. If so, then processing for this page fault is complete, and the program experiencing the page fault can continue to run, 0511. If the page is not in central storage, the routine continues processing this page fault by bringing in a new copy of the page, 0512.

Figure 7:
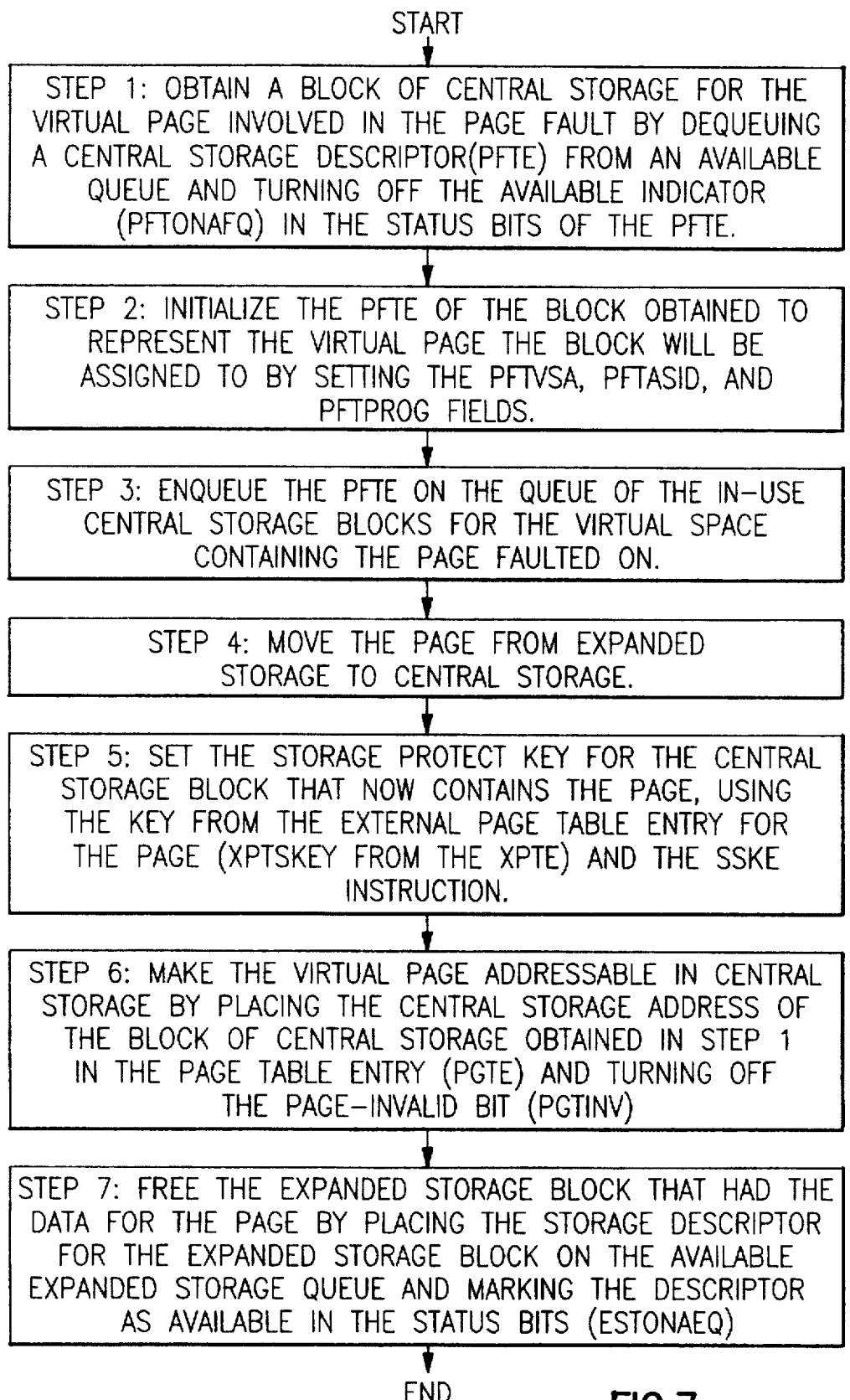
FIG. 7 is a flow diagram of descriptor table reconfiguration upon a page fault.

FIG. 7 depicts page fault processing for a virtual page which is in expanded storage. The steps include changing descriptors ESTE and PFTE in expanded and central storage, respectively. Also included are changing of the page table entry (PGTE) and the external table entry (XPTE) for the page involved in the fault processing.

The description covers only one partition running on the system. Two partitions require duplication of the operating system including the aforementioned descriptor and AIM tables. Therefore, while the invention has been shown and described with reference to a particular embodiment, it should be appreciated by those persons skilled in the art that changes and modifications may be made without departing from the spirit of the invention or the scope of the appended claims.

What is claimed is:

1. A method for managing a data structure of hardware descriptors in a computer system having virtual memory addressed using virtual memory addresses translated into physical memory addresses, said method comprising:

allocating virtual memory for said data structure to contain hardware descriptors primarily for describing processor storage increments of said computer system, said processor storage increments accessed using said physical memory addresses; and allocating real storage for said data structure for only those hardware descriptors within said virtual memory that are associated with on-line storage increments, wherein real storage is not allocated for those hardware descriptors within said virtual memory associated with off-line storage increments.

2. The method of claim 1, further comprising maintaining status indications for said storage increments of said computer system.

3. The method of claim 2, wherein said maintaining comprises:

creating an address increment map for said storage increments of said computer system; and storing said status indications in said address increment map, said status indications comprising off-line and on-line indications.

4. The method of claim 1, further comprising storing, in said virtual memory, real addresses corresponding to said real storage allocated for said hardware descriptors.

5. The method of claim 1, wherein said allocating virtual memory comprises allocating contiguous virtual memory for said data structure.

6. The method of claim 1, further comprising:

bringing on-line an additional storage increment; and allocating real storage for an additional hardware descriptor for a frame of said additional storage increment, wherein said additional hardware descriptor is added to said data structure.

7. The method of claim 6, further comprising updating a status data structure of said computer system to indicate said additional storage increment is on-line.

8. The method of claim 6, further comprising storing, in virtual memory allocated for said additional storage increment, a real address corresponding to said real storage allocated for said additional hardware descriptor.

9. The method of claim 6, wherein said additional storage increment is a newly installed storage increment of said computer system, wherein said newly installed storage increment was previously non-existent on said computer system.

10. The method of claim 1, further comprising:
removing one storage increment of said storage increments from use by said computer system; and
removing hardware descriptors for frames of said one storage increment from said data structure.

11. The method of claim 10, wherein said removing hardware descriptors comprises making available for use said real storage previously allocated for hardware descriptors of said one storage increment.

12. The method of claim 10, further comprising updating a status data structure of said computer system to indicate said one storage increment is off-line.

13. The method of claim 1, further comprising sequentially traversing at least a portion of said data structure.

14. The method of claim 13, wherein said sequentially traversing comprises:
initializing a pointer to an entry of said data structure in said virtual memory, said entry comprising at least one hardware descriptor for an increment of said storage increments;
determining whether said increment is off-line; and
resetting said pointer to another entry in said virtual memory when said increment is off-line, wherein said real storage for said data structure is not accessed when said increment is off-line.

15. The method of claim 14, wherein said determining comprises referring to a status indicator, in a status data structure of said computer system, for said increment to determine whether said increment is off-line.

16. The method of claim 14, further comprising using a real address corresponding to real storage allocated for said at least one hardware descriptor, when said increment is on-line, to retrieve said at least one hardware descriptor.

17. The method of claim 1, further comprising using said data structure to determine whether a page frame of an increment of said storage increments is available.

18. The method of claim 17, wherein said using comprises determining whether real storage is allocated for a hardware descriptor of said increment, wherein said page frame is unavailable when said real storage is not allocated.

19. The method of claim 1, wherein said storage increments comprise one or more of central storage and expanded storage of said computer system.

20. The method of claim 1, wherein said virtual memory is managed using a plurality of page table entries ("PTEs") and said hardware descriptors comprise page frame table entries ("PFTEs").

21. A system for managing a data structure of hardware descriptors in a computer system, said system comprising;
virtual memory addressed using virtual memory addresses translated into physical memory addresses, said virtual memory allocated for said data structure to contain hardware descriptors primarily for describing processor storage increments of said computer system, said processor storage increments accessed using said physical memory addresses; and
real storage allocated for said data structure for only those hardware descriptors within said virtual memory that are associated with on-line storage increments, wherein real storage is not allocated for those hardware descriptors within said virtual memory associated with off-line storage increments.

22. The system of claim 21, further comprising means for maintaining status indications for said storage increments of said computer system.

23. The system of claim 22, wherein said means for maintaining comprises an address increment map comprising said status indications for said storage increments of said computer system, said status indications comprising off-line and on-line indications.

24. The system of claim 21, wherein said virtual memory further comprises real addresses corresponding to said real storage allocated for said hardware descriptors.

25. The system of claim 21, wherein said virtual memory comprises contiguous virtual memory for said data structure.

26. The system of claim 21, further comprising:
an additional on-line storage increment; and
real storage allocated for an additional hardware descriptor for a frame of said additional on-line storage increment, wherein said additional hardware descriptor is added to said data structure.

27. The system of claim 26, further comprising a status data structure of said computer system updated to indicate said additional on-line storage increment is on-line.

28. The system of claim 26, further comprising virtual memory allocated for said additional on-line storage increment, said virtual memory comprising a real address corresponding to said real storage allocated for said additional hardware descriptor.

29. The system of claim 26, wherein said additional on-line storage increment is a newly installed storage increment of said computer system, wherein said newly installed storage increment was previously non-existent on said computer system.

30. The system of claim 21, further comprising:
means for removing one storage increment of said storage increments from use by said computer system; and
means for removing hardware descriptors for frames of said one storage increment from said data structure.

31. The system of claim 30, wherein said means for removing hardware descriptors comprises means for making available for use said real storage previously allocated for hardware descriptors of said one storage increment.

32. The system of claim 30, further comprising a status data structure of said computer system updated to indicate said one storage increment is off-line.

33. The system of claim 21, further comprising means for sequentially traversing at least a portion of said data structure.

34. The system of claim 33, wherein said means for sequentially traversing comprises:
means for initializing a pointer to an entry of said data structure in said virtual memory, said entry comprising at least one hardware descriptor for an increment of said storage increments;
means for determining whether said increment is off-line; and
means for resetting said pointer to another entry in said virtual memory when said increment is off-line, wherein said real storage for said data structure is not accessed when said increment is off-line.

35. The system of claim 34, wherein said means for determining comprises a status indicator in a status data structure of said computer system, said status indicator indicating whether said increment is off-line.

36. The system of claim 34, further comprising means for using a real address corresponding to real storage allocated for said at least one hardware descriptor, when said increment is on-line, to retrieve said at least one hardware descriptor.

37. The system of claim 21, further comprising means for using said data structure to determine whether a page frame of an increment of said storage increments is available.

38. The system of claim 37, wherein said means for using comprises means for determining whether real storage is allocated for a hardware descriptor of said increment, wherein said page frame is unavailable when said real storage is not allocated.

39. The system of claim 21, wherein said storage increments comprise one or more of central storage and expanded storage of said computer system.

40. The system of claim 21, wherein said virtual memory is managed using a plurality of page table entries ("PTEs") and said hardware descriptors comprise page frame table entries ("PFTES").

41. A computer program product comprising a computer usable medium having computer readable program code means therein for causing a data structure of hardware descriptors to be managed in a computer system having virtual memory addressed using virtual memory addresses translated into physical memory addresses, said computer readable program code means in said computer program product comprising:

computer readable program code means for causing a computer to effect allocating virtual memory for said data structure to contain hardware descriptors primarily for describing processor storage increments of said computer system, said processor storage increments accessed using said physical memory addresses; and computer readable program code means for causing a computer to effect allocating real storage for said data structure for only those hardware descriptors within said virtual memory that are associated with on-line storage increments, wherein real storage is not allocated for those hardware descriptors within said virtual memory associated with off-line storage increments.

42. The computer readable program code means of claim 41, further comprising:

computer readable program code means for causing a computer to effect bringing on-line an additional storage increment; and computer readable program code means for causing a computer to effect allocating real storage for an additional hardware descriptor for a frame of said additional storage increment, wherein said additional hardware descriptor is added to said data structure.

43. The computer readable program code means of claim 46, further comprising:

computer readable program code means for causing a computer to effect removing one storage increment of said storage increments from use by said computer system; and computer readable program code means for causing a computer to effect removing hardware descriptors for frames of said one storage increment from said data structure.

44. The computer readable program code means of claim 41, further comprising computer readable program code means for sequentially traversing at least a portion of said data structure.

45. The computer readable program code means of claim 41, further comprising computer readable program code means for causing a computer to effect using said data structure to determine whether a page frame of an increment of said storage increments is available.

46. The computer readable program code means of claim 41, further comprising computer readable code means for causing a computer to effect managing said virtual memory using a plurality of page table entries ("PTEs"), wherein said hardware descriptors comprise page frame table entries ("PFTEs").

* * * * *

UNITED STATES PATENT AND TRADEMARK OFFICE
CERTIFICATE OF CORRECTION

PATENT NO. : 5,765,210
DATED : June 9, 1998
INVENTOR(S) : Greenstein et al.

It is certified that error appears in the above-identified patent and that said Letters Patent is hereby corrected as shown below:

On the title page, under item [56]:

Attorney, Agent, or Firm-"Lawrence D. Culter, Esq." should read
--Lawrence D. Cutter, Esq.--

Signed and Sealed this

Twenty-ninth Day of June, 1999

Attest:

Attesting Officer

Q. TODD DICKINSON

Acting Commissioner of Patents and Trademarks